Aug. 18, 1936.　　　E. H. PERKINS ET AL　　　2,051,417
TRANSPORTATION OF AUTOMOBILES
Filed April 2, 1934　　　2 Sheets-Sheet 1

INVENTORS
Edward H. Perkins
BY Hubert E. Mills
Thomas Griswold Jr. & E. C. Burdick
ATTORNEYS Aug. 18, 1936.  E. H. PERKINS ET AL  2,051,417
TRANSPORTATION OF AUTOMOBILES
Filed April 2, 1934   2 Sheets-Sheet 2

INVENTORS
Edward H. Perkins
BY Hubert E. Mills
Thomas Griswold Jr. & E. C. Burdick
ATTORNEYS Patented Aug. 18, 1936

2,051,417

UNITED STATES PATENT OFFICE 2,051,417

TRANSPORTATION OF AUTOMOBILES

Edward H. Perkins and Hubert E. Mills, Midland, Mich., assignors to The Dow Chemical Company, Midland, Mich., a corporation of Michigan Application April 2, 1934, Serial No. 718,628

1 Claim. (Cl. 280—33.1)

The invention relates to methods of loading automobiles upon vehicles adapted for their transport, and particularly to a method for loading three automobiles upon a semi-trailer.

It is an object of the invention to provide a method of loading three automobiles for transportation in such manner that they can be carried in considerably less over-all space than is possible with heretofore known methods. The term "automobile" is herein used in its broad sense, and includes passenger cars, trucks, chassis with cab, etc. By "higher portion" of an automobile, as hereinafter employed, is meant that portion which requires the greater clearance height, i. e. ordinarily the cab end of a truck, or the rear end of a passenger automobile.

To the accomplishment of the foregoing and related ends, the invention, then, consists of the method hereinafter fully described and particularly pointed out in the claim, the annexed drawings and the following description setting forth in detail certain methods of carrying out the invention.

In said annexed drawings:—

Figure 1:
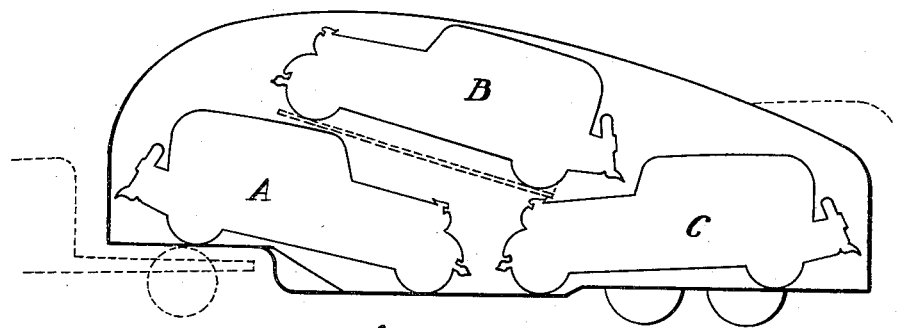
Figure 1 is a diagrammatic side sectional elevation constituting a loading diagram of our method for arranging three automobiles upon a semi-trailer.

Our method of arranging three automobiles for transportation on a semi-trailer comprises placing at the forward end of the semi-trailer an automobile with its lower portion toward the center of the semi-trailer and with the set of wheels at the end of its higher portion elevated with respect to the set of wheels at the end of its lower portion, then placing a second automobile in an elevated position with respect to said first automobile with the set of wheels at the end of its lower portion substantially above the higher portion of the first placed automobile, and with the set of wheels at the end of its higher portion extending below the top level of the higher portion of the first placed automobile, and then placing on the semi-trailer a third automobile with its lower portion endwardly adjacent the lower portion of the first placed automobile and extending below the higher portion of the second placed automobile.

Referring to the drawings:—

Figure 2:
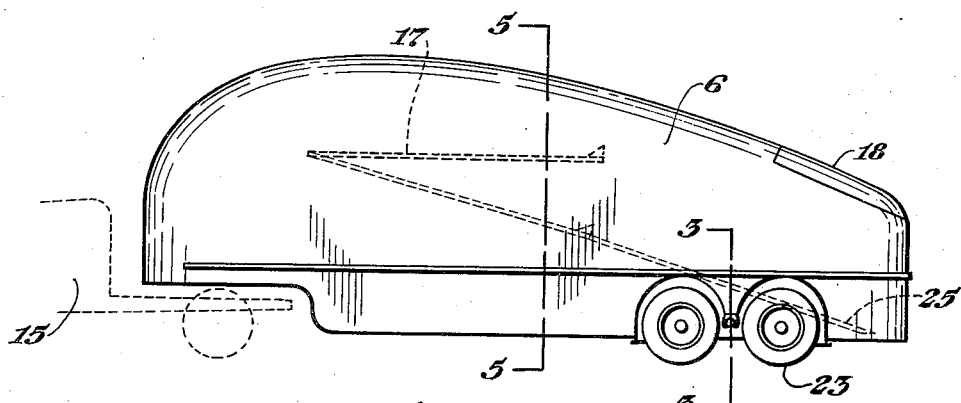
Figure 2 is a side elevation of one form of semi-trailer adapted to be loaded according to the method constituting the present invention.
Figure 4:
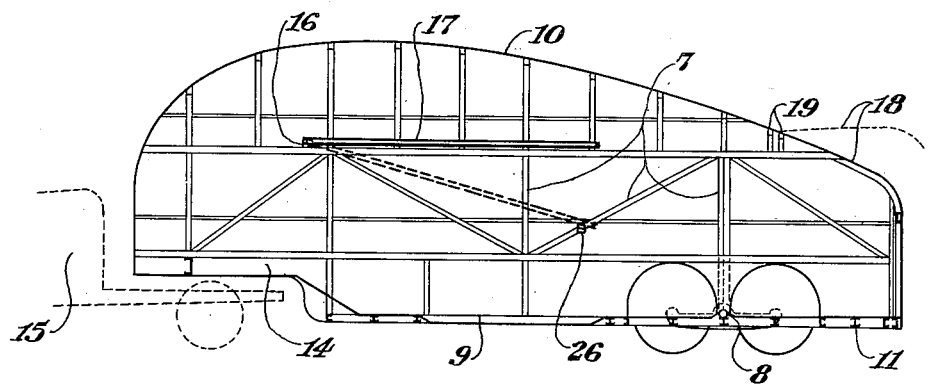
Figure 4 is a longitudinal sectional elevation of the semi-trailer shown in side elevation in Figure 2.
Figure 5:
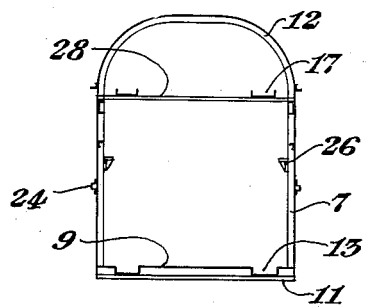
Figure 5 is a transverse section taken on the line 5—5 of Figure 2.

In Figure 2 is shown a completely enclosed semi-trailer having a body 6 comprising, as shown in Figures 4 and 5, on each side of the body a truss structure 7 carried terminally upon the axle 8, a floor 9, and a roof 10. Figures 4 and 5 show an arrangement of the transverse cross-members 11 carried by the side trusses, which members in turn carry the floor 9. In Figure 5 there is shown particularly the relationship between the cross-members 12, supporting the roof 10, and the side truss 7. In Figure 5 the guide wells 13 in the floor 9 for the wheels of the automobiles to be carried are also shown. The truss 7 is cut away at its lower forward end to provide a raised portion 14 adapted to be supported upon a pulling vehicle 15. Movable means adapted to support an automobile in an elevated position with respect to the other two automobiles is shown as a ramp 17, pivoted endwardly at the point 16 on the side truss 7. The ramp 17 is adapted to movement so that its free end can be swung upwardly to permit access of the first automobile to be placed upon the semi-trailer. The brackets 26 carried on the trusses 7 are for supporting a bar, rod or other member upon which the free end of the ramp rests when in position for carrying an automobile. The roof 10 is provided at its rear end with a section 18 movable to permit entrance of automobiles to the interior of the semi-trailer. Preferably this movable section 18 is hinged at the point 19 and means (not shown) are provided to swing the section upwardly on its hinges.

Figure 3:
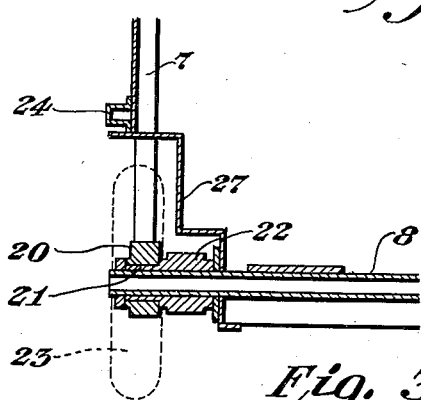
Figure 3 is an enlarged part section taken on the line 3—3 of Figure 2.

Figure 3 shows a transverse part section of the axle, walking beam, and side truss assembly. In Figure 3 the side truss 7 rests upon the bearing cap 20 containing the sleeve 21. This sleeve 21 is welded to the rocker beam 22, which beam is carried on the axle 8 laterally inside the bearing cap supporting the side truss 7. The floor 9 lies below the level of the axle 8. The tandem wheels 23 are substantially aligned transversely with the side truss 7. A fender 27 is provided for the tandem wheels 23. On the side truss 7 there is a rub-rail 24 to prevent damage to the sides of the trailer.

In Figure 1 is shown an arrangement of automobiles obtained by the carrying out of our hereinbefore described method of loading three automobiles upon the semi-trailer illustrated in the above described figures. The ramp 17 is disposed of by raising it to a horizontal position by swinging its free end upwardly and fastening it temporarily in that position. The automobile A is then run in on the floor 9 of the semi-trailer to a position at the forward end of the semi-trailer with the set of wheels at the end of its higher portion resting upon the raised portion 14 of the floor 9 over the pulling vehicle. After this automobile is in position and has been suitably fastened, the ramp 17 is adjusted to receive automobile B by swinging its free end down to rest on a tube or bar lying on brackets 26 attached to the side truss 7, a skid 25 is placed between the floor 9 of the semi-trailer, and the end of the ramp 17 and the automobile B is run in upon the ramp and fastened thereon with its lower portion toward the forward end of the vehicle and substantially overlapping the higher portion of the automobile A. The skid 25 is then removed and the automobile C is driven in upon the floor 9 of the semi-trailer with its lower portion extending beneath the higher portion of the automobile B.

It is apparent from the foregoing description that our invention provides a method of loading three automobiles upon a semi-trailer, which makes possible the carrying of the same in a minimum of length and height. This method of loading is particularly applicable for use in a completely enclosed semi-trailer.

Other modes of applying the principle of our invention may be employed instead of those explained, change being made as regards the means herein disclosed, provided the method stated by the following claim or the equivalent of such stated method be employed.

We therefore particularly point out and distinctly claim as our invention:—

In a method for loading three automobiles upon a semi-trailer having movable means adapted to support one automobile intermediate and in an elevated position with respect to the other two automobiles, the steps which consist in; first moving an automobile upon the floor of the semi-trailer at the rear thereof, with the lower portion of the automobile toward the rear of said semi-trailer, and over said floor to the forward end of the semi-trailer so that the set of wheels at the end of its higher portion is elevated with respect to the set of wheels at the end of its lower portion; then positioning said movable means so that an automobile can be transported rearwardly of and in elevated position with respect to said first-placed automobile; then moving a second automobile, having its lower portion toward the forward end of the semi-trailer, from the rear of the semi-trailer upon said movable means to a position such that its lower portion substantially overlaps the higher portion of the first-placed automobile and that the set of wheels at the end of its higher portion extends below the top level of the higher portion of the first-placed automobile; and then moving upon the floor of the semi-trailer from the rear end thereof a third automobile with its lower portion toward the forward end of the semi-trailer, to a position such that the lower portion of said third automobile is endwardly adjacent to the lower portion of the first-placed automobile and extends at least partially below the higher portion of the second-placed automobile.

EDWARD H. PERKINS.
HUBERT E. MILLS.